United States Patent Office 2,702,397
Patented Feb. 22, 1955

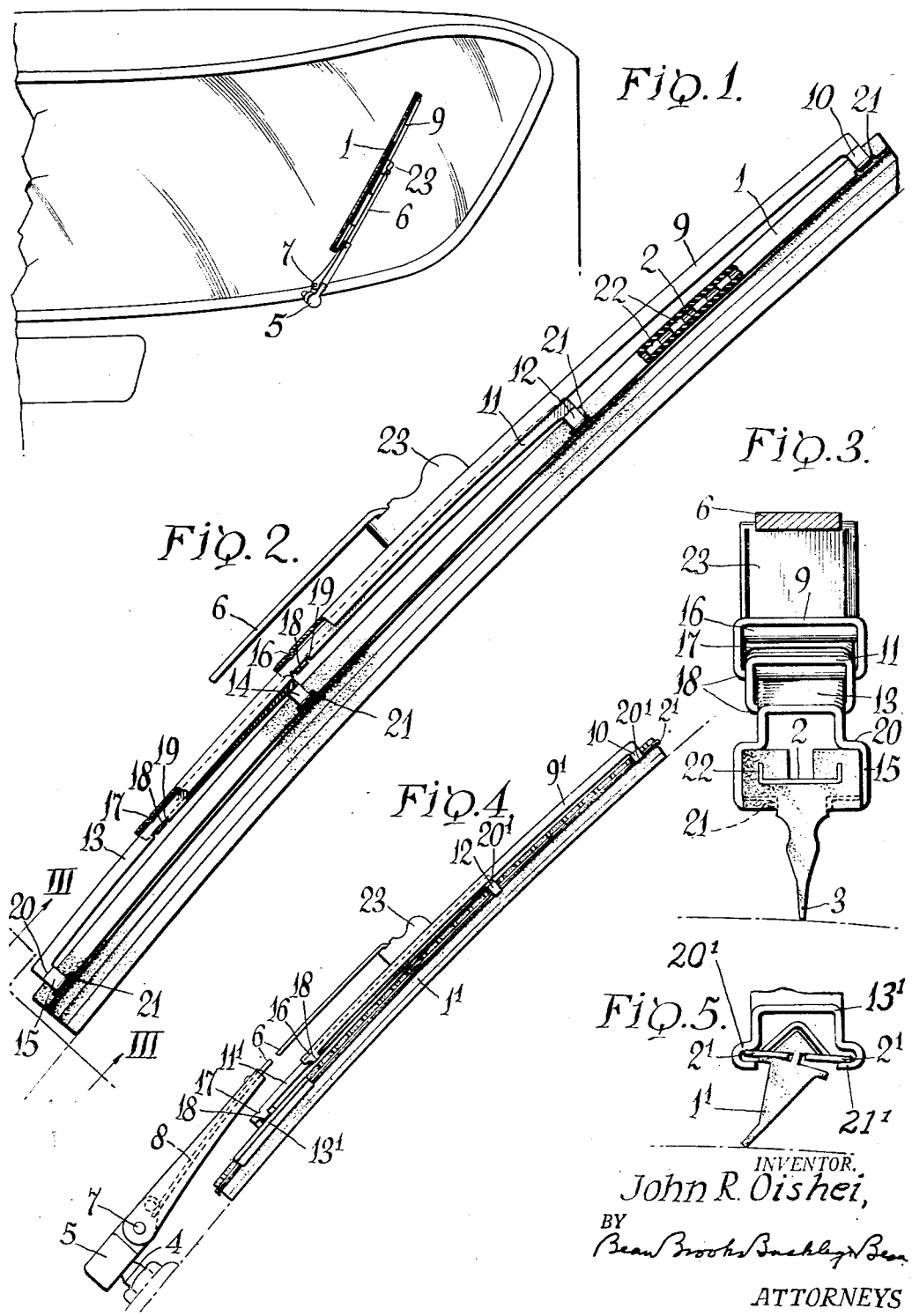

2,702,397
WINDSHIELD WIPER

John R. Oishei, Buffalo, N. Y., assignor to Trico Products Corporation, Buffalo, N. Y.

Application May 13, 1952, Serial No. 287,506

8 Claims. (Cl. 15—245)

This invention relates to the windshield cleaning art and more especially to a wiper for the curved windshields of modern motor vehicles.

Curved glass wipers have heretofore employed a combination of freely turning rockers or pivoted yokes, bridged by a centralized balancing member for the distribution of pressure received from a spring-pressed arm. This arrangement, in the form of a superstructure for mounting the blade, receives the torque from the arm mounted on an oscillating wiper shaft. The spring-pressed actuating arm is attached substantially medially of the length of the wiping blade with half of the blade extending inwardly of the point of arm connection towards the wiper shaft, and the other half extending outwardly beyond the arm attachment. During its oscillation the outer end of the blade covers a substantially larger area than the inner end. This means that the outer blade portion moves much faster than the inner portion. This, under conditions of a partially wet glass, greatly increases the friction on the blade's outer end, exerting a heavy drag that tends to rotate the blade on its longitudinal axis. The rubber is, by necessity, soft and has a tendency to cling in order to wipe properly. The strain on the blade's pressure distributing means is made worse by the required flexing of the blade and its backing strip, to permit the blade to hug the convex glass area extending over to the side of the shield which is wiped only by the outboard blade portion, the inner blade portion sliding more slowly and on a surface of less curvature. The roll of the blade is augmented by the number of joints in the superstructure. Excessive rolling or twisting of the blade causes damage to the windshield glass through scratching. The scratches pick up distracting light rays and interfere with the vision.

One object of this invention is to eliminate the cause of the roll-over of the metal holding parts of the pressure distributing means heretofore used.

Again, during the oscillation of the known wipers, the slower moving inner end of the blade receives as much of the arm pressure as the outer end which moves many times faster. The slower moving inner end wipes over a relatively flat area near the center of oscillation, as compared with the surface contour of more pronounced curvature swept by the faster moving outer end. To shape itself to the pronounced curvature on the windshield sides, the outer end portion of the blade and backing must be flexed around the convex glass surface by the arm applied pressure. It becomes apparent that more pressure is required to bend the outer end of the blade to hold the wiping lip in contact with the glass than is required at the inner end where little flexing of the backing strip is necessitated.

In the faster vehicular travel of today a further problem is presented by the curved windshield. The air currents diverge from the center to the side. These wind currents strike the outer end of the wiper blade on its inward movement and exert a lifting force thereon to lift the blade in its outer area and cause it to skip, leaving unwiped areas. The wiping performance is interrupted as part of the blade becomes ineffectual.

Another object of this invention is to provide a windshield wiper which will meet the foregoing problems in a practical and satisfactory manner through a pressure distributor that is designed first to transmit a portion of the arm pressure through a rigid lever directly to the faster moving outer end of the blade unit, thereby providing a line of pressure transmission devoid of excessive play and looseness to better control by restriction the lateral roll of the blade unit about its longitudinal axis, and second to apportion and distribute the arm applied pressure to better advantage in securing an accurate conformance to the surface for a more efficient wiper performance. This is accomplished by a pressure distributor of novel construction through which a portion of the arm pressure is transmitted directly to the outer end of the blade, and its supporting flexible backing, and the remaining pressure is distributed and proportioned over the length of the blade inwardly thereof and differentially in accordance with the individual requirements of the different blade portions. The distributor illustrated is in the nature of a superstructure or frame utilizing a leverage, or leverages, for imposing a graduated pressure upon the blade unit, starting with a heavier pressure application on the outer end of the blade with a progressive reduction inwardly toward the inner end.

More specifically, a portion of the spring pressure of the wiper arm is applied at an intermediate point to a rigid primary lever which is connected at its outer end directly to the outer end of the blade unit and has its inner end bearing upon an intermediate portion of a second lever. In turn, the second lever is similarly attached at its outer end to the blade unit inwardly from such outer end and has its inner end projecting inwardly beyond the first lever and bearing upon a base member preferably of yoke form and intermediate its length, said base member extending lengthwise of and being connected to the inner end area of the blade unit. The outer end of the primary lever is shaped to provide a transverse seat on which the outer end of the blade unit may rock to a limited extent at the start of each wiping stroke.

Reversal of the outer end of the wiping lip of the blade is initiated quickly and before the rest of the blade lip reverses, primarily by reason of the direct connection of the end of the blade to the arm. At the inner end of the blade the act of reversal is delayed by the remote conection to the arm. The result of the quicker lip roll on the outer end, combined with the delayed roll of its inner end, produces a pronounced spiralling lip movement. This movement can be seen as a progressive wave movement of the lip, traveling from the outer end to the inner. In this spiralling lip movement every bit of the lip portion is given a twist from end to end that stretches and compresses elements of the surface in a movement that is effective in breaking ice formation or other incrustration tending to form on the surface.

By the direct application of pressure to the outer end of the blade the latter is more readily flexed into surface conformance. To the portions of the blade unit inwardly from the outer end, the arm pressure is transmitted indirectly through and subdivided by the second lever and the yoke to apply a relatively lighter pressure to the less rigidly supported inner end portion of the blade unit. Fundamentally the distribution of the arm pressure is transmitted on two rocking points of contact outwardly from the arm attaching coupling and through four rocking contact points inwardly of the arm coupling to shift the center of gravity of the blade inwardly. By this means the arm coupling, besides supplying the pressure to bend the spring backing to conform the blade to the glass, is used as a freely turning fulcrum point around which the superstructure is rotated in a plane perpendicularly to the plane of the glass whereby the inner end portion of the blade unit, contacting the glass surface inwardly of the arm coupling, becomes a base for the levering of arm pressure distribution to the outer end.

The foregoing and other objects will manifest themselves as this description progresses, reference being made therein to the accompanying drawing wherein:

Fig. 1 is a fragmentary front elevation of a windshield showing the improved wiper mounted thereon;

Fig. 2 is a side elevation of the wiper with parts broken away;

Fig. 3 is an end view of the blade as seen from the plane of line III—III of Fig. 2;

Fig. 4 is a side elevation of a modified wiper; and

Fig. 5 is a fragmentary end view thereof.

Referring more particularly to the drawing, the numeral 1 designates a flexible wiping blade and 2 a surface-conforming backing therefor. The blade body is usually formed of rubber, either natural or synthetic, and has a laterally flexible wiping edge 3, while the backing may be and preferably is in the form of a spring strip that is stamped from sheet metal and affords support for the wiping edge, flexible in a direction for surface-conformance and inflexible transversely for lateral reinforcement. The blade, with its backing, is designed for oscillatory movement over a windshield surface as imparted by a shaft 4 and an arm having a mounting section 5 fixed to the shaft and a blade carrying section 6 hinged to the section 5 at 7, a spring 8 being arranged to apply the wiping pressure, all in a well known manner.

The pressure distributor is in the form of a superstructure having a primary lever 9 having one end 10 extending to the outer extremity of the blade unit with a straddling connection thereto, a second lever 11 having an end 12 extending to the outer portion of the unit at a point inwardly from the first connection and having a like guiding connection thereto, and a pressure equalizing yoke 13 having its opposite ends 14 and 15 straddling the inner end portion of the blade unit at points spaced lengthwise thereon. The levers shown are of the third class, with the pressure applied intermediate the fulcrum and the load whereby the load is always less than the pressure. The four points of contact 10, 12, 14 and 15 extend along the unit to divide the pressure as predetermined and to permit endwise freedom of movement therebetween for securing the surface conformance of the unit, and each may have a sliding contact therewith to permit freedom of flexing for securing the surface-conformance of the unit. The opposite end of lever 9 is pivotally anchored to the second lever at 16 intermediate its ends and the second lever is in turn likewise anchored to the yoke 13 intermediate its ends, as at 17. This provides an articulate frame composed of a system of levers wherein the levers overlap one another and each has one end fixed on a fulcrum point as determined by the terminal ears 18 engaging in recesses 19. Each unit-engaging end of the levers and yoke has its sliding connection with the blade unit established through a pair of unit-straddling presser feet 20 which bear upon the back of the blade unit to exert a balanced downward pressure on the opposite side margins of the backing strip, the feet having claw extensions 21 loosely engaging about and under the back portion of the blade in a manner similar to the showing in my earlier Patent No. 2,700,785. As shown therein, the flexible backing strip 2 has upstanding anchor lugs 22 to maintain the blade and the backing in operating engagement.

From the foregoing it will be observed that the arm pressure is applied directly to the primary pressure distributing lever 9 and that a part of the spring pressure is transmitted directly to the outer end of the wiper unit 1, 2, while the remaining part is transmitted indirectly through the articulations 16, 12, 17, 14 and 15. The directly applied pressure is carried through a point or line contact of transverse extent where it will be most effectual in pressing it into surface-conformance. It will also be observed that the remaining portion of the arm pressure passed on to the yoke 13 is subdivided thereby and spread or distributed in a relatively light pressure over the inner end of the blade where a heavy pressure is neither desired nor required. The yoke 13 which is connected at both ends to the blade unit may be considered a base member serving to spread the inner portion of the arm pressure relatively lightly along the inner end portion of the blade.

The secondary lever 11 serves in a capacity of an intermediate selective pressure member for applying a predetermined spring urge to the outer end portion of the blade but inwardly from the point of pressure application for the lever 9. The inner end of the lever 9 bears upon an intermediate portion of the secondary lever 11 which in turn bears upon an intermediate portion of the yoke. The location of the fulcrum points determines the subdivisions of arm pressure to be applied to the respective areas of the blade. The coupler 23 by which the outer end of the arm is connected to the wiper is preferably fixed. Its location, like the location of the fulcrum points 16 and 17, will also serve to proportion the arm pressure along the blade.

The lever 11 provides a support for the medial and outboard areas of the blade between the points of attachment 10 and 14 to give lateral support and guidance for such medial portion of the otherwise long span. The two levers 9 and 11 which apply the surface-conforming pressure to the outer end portion of the blade are both pivoted inwardly of the coupling 23 and consequently are inward from the point at which the arm pressure is initially applied to the distributor. The lever 9 fulcrums at 16 upon the secondary lever 11 and the latter fulcrums at 17 on the pressure spreading yoke 13, with both fulcrum points being placed in adjacency to the points of attachment 14 and 15 of the yoke to the inner end portion of the blade, thereby locating the intermediate points of connection 16 and 17 on the slower moving end portion of the blade while the outer ends of the levers 9 and 11 are directly connected to the blade outwardly beyond the coupling 23. This locates only two of the several points of connection on the faster moving outer end of the blade, and the outer one of these two receives the arm pressure directly for providing a steadier support therefor devoid of any uncontrolled looseness.

The pressure distributor shown in Figs. 4 and 5 comprises a base member or yoke 13', having a pressure spreading contact with the inner end portion of the blade for dividing the arm applied pressure into lesser increments, a secondary lever 11' which fulcrums at one end on the medial portion of the yoke and has its other end reaching over to and bearing upon the outer end portion of the blade 1', and a primary lever 9' that is fulcrumed at one end on an intermediate part of the lever 11' and in turn has its opposite end reaching out to the outer extremity of the blade unit to provide a rigid and firm seat on which the blade unit may rock within defined limits.

The arm coupling 23 is fixed directly to the lever 9'. The claws 21' of the presser foot 20' of the levers 9' and 11' straddle and engage about the longitudinal margins of the channeled holder or backing strip 2' at its outer end portion, the opposite end of the lever 11' being anchored to fulcrum on the yoke 13'. The construction of this channeled holder is shown more clearly in Patent No. 2,687,544.

In Figs. 2 and 3, the presser feet 20 with the claw extensions engage about the opposite side margins of the backing strip 2 to support the latter in its operative position for affording surface-conforming support for the wiping edge 2 while providing lateral inflexible support for the blade as it oscillates over the windshield surface. In this embodiment the claws slidably grasp or support the flexible backing through the rubber. In the modified showing of Figs. 4 and 5 they directly engage the flexible backing 2'.

In both embodiments a predetermined ratio of the arm pressure is directly transmitted to the outer extremity of the blade through a one-piece rigid lever on which the arm coupling 23 is fixed. Consequently, any lifting urge placed upon the outer end of the blade by violent wind currents must act against this direct application of arm pressure. For a shorter blade, the secondary lever may be omitted. Should a longer blade unit be required, another secondary or rather tertiary lever could be inserted to increase the number of levers in the series while still maintaining the position of the arm coupling 23 on the outermost lever that extends directly to the outermost end of the blade so as to present a minimum amount of surface area exposed to the wind.

The accomplishment by this construction serves to reduce lifting action of the wind in the three following ways. (1) The above-mentioned reduction of "surface area exposed to the wind." (2) Direct transmission of arm holding pressure to the outermost, and most vulnerable, part of the blade. (3) Direct and rigid control of blade position at this point and its effect in holding the blade against excessive twist or rollover. The instant construction accommodates the outer end of the blade to in-and-out movements with a minimum number of pivoting points because of the direct lever construction, and therefore with less frictional disturbance to evenness of pressure at this critical part of blade movement where the rate of travel is much greater than at any other part. This insures a better wipe.

In this connection it will be noted that, regardless of the number of the pressure applying levers employed, the elevation of the arm coupling remains at a minimum. The height or upward extent of the surface area of the pressure distributor likewise remains relatively low thereby to hold to a minimum the lifting action of the air currents on the wiper. The levers individually straddle the blade unit and from such points of direct connection thereto they respectively lean inwardly upon the next inner lever for bearing support thereon until the innermost lever is finally anchored to the yoke through a movable joint.

The levers being fulcrummed inwardly of the arm attachment 23 places the center of gravity of the blade inwardly thereof and away from its outer end. This gives a decided reduction in the momentum, or inertia, in the blade in its arcuate movement across the shield to reduce the whip, or over-travel action of a rapidly moving blade at the time of reversal.

The direction connection of the primary lever to the outer end of the blade transmits the driving force of the arm thereto and gives a much better control of the turnover motion of the wiping edge in that it limits the roll at the outer end before it passes inwardly to the more loosely mounted inner end. At the start of a stroke there is a tendency for the wiping edge to rotate first at the faster moving outer end of the blade and thence inwardly along the blade which by reason of the control factor at the outer end produces a longitudinal ripple action which starts outboard and which rollingly flexes the lip section of the blade. This ripple flexing is desirable to prevent ice from building up on the rubber lip under such conditions as when the windshield glass is warmed by the defroster and the temperature of the air outside the car is below freezing.

The foregoing description has been given in detail without thought of limitation since the inventive teachings disclosed are capable of assuming other physical embodiments without departing from the spirit of the invention and the scope of the appended claims.

What is claimed is:

1. A windshield cleaner comprising an elongate flexible blade having an elongate flexible backing, said backing being rigid transversely and supporting the blade, means for distributing pressure from an oscillatable wiper arm and including first and second levers of the third class and a yoke, one end of the first lever being connected to one end of the blade, arm attaching means on said first lever, the other end of said first lever having a fulcrum point on the second lever to which pressure from the arm is transmitted from the first lever to the second lever, the second lever having an end attached to the blade beneath the first lever and having its other end bearing on the yoke to fulcrum thereon, the yoke being attached at both of its ends to the blade inwardly and outwardly of the last named fulcrum.

2. A windshield cleaner comprising an elongate flexible blade having an elongate flexible backing, said backing being rigid transversely and attached to the blade, means distributing pressure from an oscillatable wiper arm and comprising two levers of the third class and a yoke, the first of said levers adapted for receiving arm pressure at a point intermediate its ends and with one of its extremities attached to one end of the blade, the other end of said first lever applying a portion of the arm pressure to an intermediate point of the second of said levers, one end of said second lever extending out and having pressure applying contact on the blade beneath the span of the first lever, the other end of said second lever applying a portion of said arm pressure to the yoke at a point intermediate its ends and with each end of said yoke connected to the blade.

3. A windshield wiper for flat and convexed surfaces comprising an elongate blade unit having an elongate backing spring flexible for surface-conformance and laterally inflexible, a blade carrying superstructure comprising an elongate lever having a seat on one end on which the wiper unit directly engages adjacent one end thereof, said lever extending longitudinally of the said blade beyond the midpoint thereof, a second elongate lever having one end attached to the wiper unit beneath the span of the first named lever and extending longitudinally beyond the other end of the first lever and pivotally connected thereto, a yoke having one end attached to the wiper unit beneath the second named lever and having its opposite end attached to the wiper unit adjacent the other end of the latter, the yoke being positioned to receive pressure from the first named lever through the second lever, and arm attaching means provided on the first lever intermediate its ends, said blade having a wiping edge freely flexible while passing over a convex surface of the glass.

4. A windshield wiper having an elongate blade and an elongate flexible backing spring comprising a surface-conforming laterally-rigid wiper unit, a blade carrying superstructure comprising two elongated levers arranged in partial overlapping endwise relation one above the other and being rockingly connected to each other, each of said levers having an end bearing on the outer end portion of the wiper unit at longitudinally spaced points, and a yoke having both of its ends connected to the inner portion of the wiper unit to provide a balanced pressure distribution over such end portion, the upper lever having an arm coupling intermediate its ends, the other lever having its opposite end pivoting on the yoke between its ends.

5. In an oscillatory wiper blade for flat and convex surfaces, means for connecting an elongate blade having an elongate backing strip to a wiper arm, said means comprising two pivotally connected elongate lever members extending radially with the blade and nestingly arranged in partially overlapping relation to each other, one end of the outer lever being slidably connected to the backing strip, the outer lever having its opposite end connected to an intermediate portion of the inner lever, a yoke providing pivotal support for one end of the inner lever, the opposite ends of the yoke being connected to the backing strip, with the outer lever arranged to receive in its intermediate portion the pressure from the arm.

6. In a windshield wiper for curved and flat glass, an elongate blade having a flexible elongate backing strip on which the blade is flexibly supported in one direction and rigid in a direction at right angles thereto, pressure distributing means including a wiper arm coupling for the distribution of arm pressure and having two lever members each with individual movable connections to the blade and its backing toward one end of the latter from the said arm attaching coupling, the said blade and backing strip being supported by a yoke from two rocking points toward the opposite end from the arm coupling, one lever member having its opposite end supported on the other lever member and the latter having its opposite end supported on the yoke, and both lever members acting upon the backing with differing leverages to conform said blade and backing to the contour of the glass.

7. A wiper for curved windshields, comprising an elongate wiping blade flexible for surface-conformance and inflexible laterally, a yoke extending lengthwise of the blade and having its opposite ends connected to the inner end portion thereof, a lever having one end connected to the outer end of the blade for applying a blade flexing portion of the arm pressure thereto through a single point contact therewith, a second lever interposed between the first lever and the yoke and having one end connected to the yoke between its ends and its opposite end connected to the outer end of the blade inwardly of the outer end connection aforesaid, the opposite end of the first lever being connected to the second lever intermediate its ends, and arm attaching means on said first lever intermediate its ends, the connections of said levers to the blade being through individual spaced apart points of engagement.

8. A windshield wiper comprising a wiping blade, and a pressure distributing frame having a base member secured to one end portion of the blade, and a series of pressure applying levers leaning at one end one upon the other and the latter upon the base member and having their opposite ends bearing upon the blade at intervals throughout its length the levers being pivotally interconnected to one another and to the intermediate portion of the base member, the outer one of the levers being provided with arm attachment means.

References Cited in the file of this patent

UNITED STATES PATENTS

| 2,254,343 | Zierer | Sept. 2, 1941 |
| 2,664,583 | Oishei | Jan. 5, 1954 |

FOREIGN PATENTS

| 666,473 | Great Britain | Feb. 1952 |
| 667,253 | Great Britain | Feb. 1952 |
| 958,708 | France | of 1949 |